(12) United States Patent
Ma et al.

(10) Patent No.: US 6,232,369 B1
(45) Date of Patent: *May 15, 2001

(54) INK JET INKS CONTAINING HYDROSOLS AS POLYMER ADDITIVES

(75) Inventors: Sheau-Hwa Ma, Chadds Ford, PA (US); Waifong Liew Anton, Wilmington, DE (US)

(73) Assignee: E. I. du Pont de Nemours and Company, Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/775,041

(22) Filed: Dec. 27, 1996

(51) Int. Cl.$^7$ .................................................. C09D 11/10
(52) U.S. Cl. ..................... 523/161; 524/505; 524/533; 524/555; 524/556
(58) Field of Search ........................ 523/161; 106/20 D; 524/505, 533, 555, 556

(56) References Cited

U.S. PATENT DOCUMENTS

| | | | |
|---|---|---|---|
| 4,597,794 | 7/1986 | Ohta et al. | 106/20 C |
| 5,085,698 | 2/1992 | Ma et al. | 106/20 D |
| 5,221,584 | * 6/1993 | Nickle et al. | 428/515 |
| 5,231,131 | 7/1993 | Chu et al. | 524/504 |
| 5,272,201 | 12/1993 | Ma et al. | 524/505 |
| 5,519,885 | * 5/1996 | Ma et al. | 524/503 |

FOREIGN PATENT DOCUMENTS

| | | | |
|---|---|---|---|
| 0 556 649 A1 | 8/1993 | (EP) | C09D/11/00 |
| 0 571 190 A2 | 11/1993 | (EP) . | |
| 0 732 344 A2 | 9/1996 | (EP) . | |
| 6-100810 | 4/1994 | (JP) | C09D/11/00 |
| 07126562 | 5/1995 | (JP) . | |

* cited by examiner

Primary Examiner—Blaine Copenheaver
Assistant Examiner—John J. Guarriello
(74) Attorney, Agent, or Firm—Joseph A. Tessari

(57) ABSTRACT

An ink for ink jet printers contains an aqueous carrier medium; an aqueous carrier medium insoluble colorant; a polymeric dispersant; and a hydrosol polymer is stable, exhibits excellent print quality, and provides excellent smear resistance after drying and good decap or crusting time.

16 Claims, No Drawings

INK JET INKS CONTAINING HYDROSOLS AS POLYMER ADDITIVES

BACKGROUND OF THE INVENTION

This invention relates to aqueous inks for ink jet printers, and more particularly, to aqueous ink jet inks containing hydrosols as additives to improve smear resistance of the ink.

Ink jet printing is a non-impact printing process in which droplets of ink are deposited on a substrate such as paper or transparency film in response to an electronic signal. Low cost and high quality of the output, combined with relatively noise free operation, have made ink jet printers a popular option to other types of printers used with computers. Both dyes and pigments have been used as ink colorants for ink jet printers. The dye-based inks while in general superior in color properties, have several disadvantages as compared to pigment based inks. The dyes are usually water soluble and remain so after drying on the substrate. They are easily redissolved by water spills, and the image smears on contact with felt pen markers. In addition, the dyes exhibit poor light stability relative to pigments and are known to fade even under office lighting. Thus, dye-based inks are often unsuitable for use in applications requiring moisture resistance and greater light stability. The pigments are preferred colorants provided the pigment dispersion can be made resistant to flocculation and settling.

Polymeric additives may be added to the pigmented inks to further improve their resistance to smear/smudge or general handling. However, such additives have a great tendency towards generating problems for the ink jet printing process. The most common ones include 1). aggravating the pigment dispersion stability; 2). building up solids around the nozzle plate resulting in misdirection of the ink drop or complete blockage of the ink delivery; and 3). interfering with the ink drop generation, especially in the bubble formation in a thermal ink jet device.

There exists a need for ink jet inks which have good water resistance and smear fastness. In particular, with pigment based inks there is a need to maintain the stability of the dispersion and pen reliability while improving water and smear fastness.

SUMMARY OF THE INVENTION

The present invention provides an ink jet ink composition comprising:

(a) an aqueous carrier medium;

(b) an aqueous carrier medium insoluble colorant;

(c) polymeric dispersant; and (d) a hydrosol polymer.

Preferably, the hydrosol polymer is an acrylic hydrosol polymer. The inks of the invention are stable, have low viscosity, exhibit excellent print quality, provide excellent smear resistance after drying and good decap or crusting time. They may be used with a variety of ink jet printers such as continuous, piezoelectric, drop-on-demand and thermal or bubble jet drop-on-demand, and are particularly adapted for use in thermal ink jet printers. These inks may also be useful in air brush printing devices.

DETAILED DESCRIPTION OF THE EMBODIMENTS

The invention provides an ink jet ink composition which is particularly suited for use in ink jet printers in general, and thermal ink jet printers in particular. Essentially, the ink composition comprises an aqueous carrier medium, a colorant that is insoluble in the aqueous medium, a polymeric dispersant (preferably a structured polymeric dispersant); and a hydrosol polymer, preferably an acrylic hydrosol polymer. The inks may be adapted to the requirements of a particular ink jet printer to provide a balance of light stability, smear resistance, viscosity, surface tension, high optical density, and crust resistance.

Aqueous Carrier Medium

The aqueous carrier medium is water or a mixture of water and at least one water soluble organic solvent. Selection of a suitable mixture depends on requirements of the specific application, such as desired surface tension and viscosity, the selected colorant, drying time of the ink, and the type of substrate onto which the ink will be printed. Representative water-soluble organic solvents that may be selected are disclosed in U.S. Pat. No. 5,085,698. A mixture of water and a polyhydric alcohol, such as diethylene glycol, is preferred as the aqueous carrier medium.

If a mixture of water and a water-soluble solvent is used, the aqueous carrier medium usually contains from about 30% to about 95% water with the balance (i.e., 70 to 5%) being the water-soluble solvent. Preferably, the aqueous carrier medium is 60–95%, by weight, water. The aqueous carrier medium comprises 70 to 99.8%, by weight of the total ink composition, depending on the type of colorant selected. Preferably, the aqueous carrier medium comprises 94–99.8% when an organic pigment is selected; 70 to 99.8% when an inorganic pigment is selected; and 80 to 99.8% when a dye is selected.

Colorants

The colorant is either a dye or a pigment that is insoluble in the aqueous carrier medium. By the term "dye" we mean a colorant that becomes soluble at some point during the printing process. By "pigment" we mean a colorant that is insoluble (i.e., in particulate or crystalline form) throughout the printing process. Pigments are the preferred colorants for use in the compositions of this invention.

Pigments

Useful pigments comprise a wide variety of organic and inorganic pigments, alone or in combination. The pigment particles are sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from settling. It is also desirable to use small particles for maximum color strength. The range of useful particle size is approximately 0.005 micron to 15 microns, preferably 0.005 to 5 microns, and most preferably from 0.01 to 0.3 micron.

The selected pigment may be used in dry or wet (i.e., presscake) form. In presscake form, the pigment is not aggregated to the extent that it is in dry form and therefore do not require as much deaggregation in the process of preparing the inks. Representative commercial dry and presscake pigments that may be used in practicing the invention are disclosed in U.S. Pat. No. 5,085,698 issued Feb. 4, 1992.

Fine particles of metal or metal oxides also may be used to practice the invention. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

In the case of organic pigments, the ink may contain up to approximately 30% pigment by weight, but will generally be in the range of approximately 1 to 15%, preferably approximately 1 to 8%, by weight of the total ink composition for most ink jet printing applications. If an inorganic pigment is selected, the ink will tend to contain higher weight percentages of the pigment than with comparable inks employing organic pigment, and may be as high as approximately 50% because inorganic pigments generally have higher specific gravities than the organic pigments.

Dyes

The color and amount of dye present in the ink composition is largely a function of choice, being primarily dependent upon the desired color of the print achieved with the ink, the purity of the dye and its strength. Low concentrations of dye may not give adequate color vividness whereas high concentrations may result in poor printhead performance or unacceptably dark colors. Generally, the dye will be present in the amount of 0.01 to 20%, preferably 0.05 to 8%, and most preferably 1 to 5%, by weight, based on the total weight of the ink composition.

Dispersant

Polymeric dispersants suitable for practicing the invention include random polymers and structured polymeric dispersants such as block copolymers and branched-type polymers. The polymers may be anionic, cationic, or non-ionic in nature.

Random polymers are not as effective in stabilizing colorant dispersions as structured polymers and, therefore, are not preferred. However, a random polymer which has both hydrophilic sections for aqueous solubility and hydrophobic sections for interaction with the colorant and an average molecular weight to contribute to the dispersion stability can be effectively used to practice the present invention. Such polymeric dispersants are disclosed in U.S. Pat. No. 4,597,794.

The block polymers suitable for practicing the invention are AB, BAB and ABC type structures. A block polymer which has hydrophobic and hydrophilic blocks and balanced block sizes to contribute to the dispersion stability may be advantageously used to practice this invention. Functional groups can be built into the hydrophobic (colorant binding) block for stronger specific interactions between the colorant and the polymer dispersant to give an improved dispersion stability. A detailed description of these polymers can be found in the aforementioned U.S. Pat. Nos. 5,085,698 and 5,272,201 and in EPO application 0 556 649 A1, published Aug. 25, 1993.

The amount of the polymer depends on the structure, molecular weight and other properties of the polymer, and on the other components of the ink composition. The dispersant polymers that are selected in practicing the invention have number average molecular weight of below 40,000, preferably below 20,000, and typically in the range of 2,000 to 10,000.

The polymeric dispersant may be present in the amount of 0.1 to 25%, preferably 0.1 to 8% by weight, based on the total weight of the ink composition. If the amount is too high, it will be difficult to maintain the desired ink viscosity. Dispersion stability will be adversely affected if insufficient polymer is present.

Hydrosol Polymer

The hydrosol polymers are water-insoluble polymers initially synthesized in organic solvent and then dispersed as a separate phase in the aqueous carrier medium. Primarily, the hydrosol polymers will contain hydrophobic non-functional monomers to adjust the polymer properties for optimal smear resistance without sacrificing other ink properties, such as pigment dispersion stability, water fastness, viscosity, surface tension, etc. Monomers that are particularly useful for this purpose include methyl acrylate, ethyl acrylate, propyl acrylate, n-butyl acrylate, hexyl acrylate, 2-ethylhexyl acrylate, phenyl acrylate, benzyl acrylate, 2-phenylethyl acrylate, hydroxyethylacrylate, methyl methacrylate, ethyl methacrylate, propyl methacrylate, n-butyl methacrylate, hexyl methacrylate, 2-ethylhexyl methacrylate, phenyl methacrylate, benzyl methacrylate, 2-phenylethyl methacrylate, hydroxyethyl methacrylate, and the like. Low levels of non-acrylic monomers may be incorporated to improve physical properties of the polymer. Useful examples include styrene, a-methyl styrene, vinyl naphthalene, vinylidene chloride, vinyl acetate, vinyl chloride, acrylonitrile, and the like.

Preferably, the hydrosols will contain functional groups that will self-stabilize the hydrosol in the aqueous medium. These functional groups are characterized by their solubility in aqueous medium and can be non-ionic (e.g., polyethylene oxide groups), anionic (e.g., carboxyl groups, sulfonic acid groups), or cationic (e.g., ammonium groups) hydrosols. Accordingly, the hydrosols can be designed to carry either an anionic charge or cationic charge or no charge to suit the application.

The number of the functional groups required to stabilize the hydrosol depends on the composition of the polymer and the molecular weight of the polymer. The number of functional groups needs to be high enough to provide the stability throughout the life of the ink, yet if the hydrosol contains too many of these groups, it will become completely soluble in the aqueous medium and the improved smear resistance of the inks will be diminished. Usually, a more hydrophilic polymer composition would require fewer number of such groups. A polymer of lower molecular weight may require more stabilizing groups to ensure the distribution of them on all polymer chains. The amount of the hydrophilic polyethyleneoxide containing monomers are used to control the hydrophilicity of the hydrosol polymer as a whole. In general, the acid monomers are used in an amount of about 0.5–10%, preferably 1–5% by weight based on the total weight of the polymer for the anionic hydrosols. The amine monomers are used in an amount of about 2–20%, preferably 5–15% by weight based on the total weight of the polymer for the cationic hydrosols.

The functional groups are usually incorporated into the polymer structure by copolymerizing monomers that contain such groups. Examples of useful monomers containing the non-ionic hydrophilic ethylene oxide groups include 2-(2-methoxyethoxy)ethyl acrylate, 2-(2-methoxyethoxy)ethyl methacrylate, ethoxytriethyleneglycol methacrylate, methoxy polyethyleneglycol (molecular weight of 200–100) monomethacrylate, polyethyleneglycol (molecular weight 200–1000) monomethacrylate, and the like. Examples of useful monomers containing the ionizable groups for anionic hydrosols include acrylic acid, methacrylic acid, crotonic acid, itaconic acid, itaconic acid monoester, maleic acid, maleic acid monoester, maleic anhydride, fumaric acid, fumaric acid monoester, styrene sulfonic acid, 2-acrylamido-2-propane sulfonic acid (AMPS), and the like. For cationic hydrosols, the preferred ionizable monomers are the amine containing monomers. The amine groups may be primary, secondary, or tertiary amine groups, or mixtures thereof. Examples of amine containing monomers include N,N-dimethylaminoethyl acrylate, N,N-dimethylaminoethyl methacrylate, N,N-diethylaminoethyl methacrylate, t-butylaminoethyl methacrylate, 2-N-morpholinoethyl acrylate, 2-N-morpholinoethyl metharylate, 4-aminostyrene, 2-vinylpyridine, 4-vinylpyridine, and the like.

To further enhance the hydrosol stability, the polymer may contain up to about 5%, preferably up to about 2.0% by weight, based on the weight of the hydrosol polymer, of surface active monomers. The surface active monomers may be nonionic, such as SAM 185 (HLB=6.9), SAM 186 (HLB=9.9), and SAM 187 (HLB=14.0) (PPG-MAZER, Chemicals Group Technical Centers, PPG Industries, Inc., Monroeville, PA),which are characterized by the following general formula:

Polymerizable Group (Allyl) - hydrophobe - $(OCH_2CH_2)n$ -OH The surface active monomers may also be ionic, such as TREM LF-40, a 40% solution of the sodium salt of ally dodecyl sulfosuccinate supplied by Henkel Chemical Corp., Ambler, Pa. Mixtures of the nonionic type and the ionic type can be advantageously employed for additional stabilization effect. It is important that the charge characteristics of the ionic surface active monomers are compatible with the charge characteristics of the hydrosol polymer.

To invert the hydrosol polymer into the aqueous carrier medium, it may be necessary to ionize the functional groups on the hydrosol polymer in an aqueous solution under vigorous agitation. For hydrosols containing anionic functional groups, the groups are neutralized/ionized with bases, such as alkali metal hydroxides, alkali metal carbonate and bicarbonate, organic amines (mono-, di-, tri-methylamine, morpholine, N-methylmorpholine), organic alcohol amines (N,N-dimethylethanolamine, N-methyl diethanolamine, mono-, di-, tri-ethanolamine), ammonium salts (ammonium hydroxide, tetra-alkyl ammonium hydroxide), and pyridine. For hydrosols containing cationic groups, the groups are neutralized/ionized with acids, such as organic acid (acetic acid, propionic acid, formic acid, oxalic acid), hydroxylated acids (glycolic acid, lactic acid), halogenated acids (hydrochloric acid, hydrobromic acid), and inorganic acids (sulfuric acid, phosphoric acid, nitric acid). The cationic groups can also be prepared by converting the amine groups to tetraalkyl ammonium salt by using alkylating agents such as methyl iodide, methyl bromide, benzyl chloride, methyl p-toluene sulfonate, ethyl p-toluene sulfonate, dimethyl sulfate, and the like.

The size of the polymeric particles of the hydrosol in the finished inks depends on the polymer composition and the aqueous carrier medium. The more hydrophilic compositions tend to be swollen by the aqueous medium easily to give particles having a large size while the hydrophobic compositions tend to give particles having size of less than 0.5 micron.

The hydrosols may be either linear or graft or branched polymers. The linear acrylic hydrosol polymers can be conveniently prepared by those skilled in the art using the conventional free radical solution polymerization process. Useful examples of initiators include benzoyl peroxide, hydrogen peroxide and other peroxy compounds such as t-butyl peroxypivalate, t-butyl peracetate, t-butyl peroctoate, and azo compounds such as azoisobutyronitrile, and the Vazo® initiators that are commercially available from the DuPont Company (Wilmington, Del.). The solvent used for the polymerization is preferably miscible with water so that the polymer can be conveniently inverted. Alternatively, the solvents can be displaced with a water miscible solvent after the polymerization step is completed and before the inversion step. Examples of useful solvents include alcohols such as methanol, ethanol, n-propanol, isopropanol, ketones such acetone, methyl ethyl ketone, acetates such as ethyl acetate, butyl acetate, glycol ethers such as ethylene glycol monobutyl ether, ethylene glycol monobutyl ether acetate, propylene glycol monomethyl ether, pyrrolidones such as 2-pyrrolidone, N-methyl pyrrolidone, and the mixtures thereof. The molecular weight of the polymer can be controlled by the conventional methods of adding chain transfer agent such as mercaptans. The resulting polymers that are useful for practicing the invention have a weight averaged molecular weight in the range of 5,000–150,000, preferably in the range of 10,000–100,000.

For the hydrosols having a graft or a branched structure, the stabilizing groups may be concentrated either on the backbone or in the arms. With such arrangement, excellent hydrosol stability can be obtained with fewer number of stabilizing groups and thus exhibit greater resistance to smear/smudge and general attack of humidity. The graft polymers are most conveniently prepared by the macromonomer approach as described in Chu et al in U.S. Pat. No. 5,231,131. A macromonomer containing selected monomers, either predominantly monomers with the hydrophilic stabilizing groups or the hydrophobic monomers, may be prepared by methods suggested in Unexamined Japanese Patent Application (Kokai) No. 6-100,810 where conventional organic chemistries are employed to build the terminal polymerizable double bond in a polymer, or by methods suggested by Chu et al where a special chain transfer agent like cobalt complexes are employed. The macromonomers are then copolymerized with the remaining monomers and become the arms or branches of the graft copolymer.

The hydrosol polymer may be present in the amount of 0.1 to 20% by weight, preferably 0.5 to 10% by weight, based on the total weight of the ink composition to effectively improve smear resistance without impeding the pen reliability.

Other Ingredients

Consistent with the requirements of the invention, various types of additives may be used to optimize the properties of the ink compositions for specific applications. Surfactants may be used to alter surface tension as well as maximize penetration of the ink into the printing substrate. However, the type of surfactants and the amounts used need to be carefully selected to avoid destabilization of the colorant dispersion or to negate the smear improvements obtained with the addition of the hydrosols.

As is well known to those skilled in the art, biocides may be used in the ink compositions to inhibit growth of microorganisms. Sequestering agents such as EDTA may also be included to eliminate deleterious effects of heavy metal impurities. Other known additives, such as humectants, viscosity modifiers and other acrylic or non-acrylic polymers made also be added to improve various properties of the ink compositions as desired.

Ink Preparation

The inks are prepared by premixing the selected colorants and dispersant in the aqueous carrier medium and then dispersing or deflocculating the colorant. This step may be accomplished in a horizontal mini mill, a ball mill, an attritor, or by passing the mixture through a plurality of nozzles within a liquid jet interaction chamber at a liquid pressure of at least 1000 psi to produce a uniform dispersion of the colorant in the aqueous carrier medium.

It is generally desirable to make ink jet inks in concentrated form to maximize the efficiency of the manufacturing process and equipment. The concentrated ink jet inks are subsequently diluted to the appropriate concentration for use in the ink jet printing system by adding water and/or appropriate solvents. By dilution, the ink is adjusted to the desired viscosity, color, hue, saturation density, and print area coverage for the particular application.

Jet velocity, separation length of the droplets, drop size, and stream stability are greatly affected by the surface tension and the viscosity of the ink. Pigmented ink jet inks suitable for use with ink jet printing systems should have a surface tension in the range of about 20 dyne/cm to about 70 dyne/cm and, more preferably, in the range 30 dyne/cm to about 70 dyne/cm. Acceptable viscosities are no greater than 20 cP, and preferably in the range of about 1.0 cP to about 10.0 cP. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. They may be used with a variety of ink jet printers such as continuous, piezoelectric drop-on-demand and thermal or bubble jet drop-on-demand, and are particularly adapted for use in thermal ink jet printers. The inks have excellent storage stability for a long period and do not clog in an ink jet apparatus. Fixing the ink on the image recording material, such as, paper, fabric, film, etc., can be carried out rapidly and accurately.

EXAMPLES

The invention will now be further illustrated by, but not limited to, the following examples, in which parts and percentages are by weight unless otherwise noted.

Example 1

Preparation of linear hydrosol methyl methacrylate-co-ethoxytriethylene glycol methacrylate-co-methacrylic acid, 25/73/3% by weight

| Ingredient | Amount (grams) |
|---|---|
| Portion 1: | |
| Acetone | 125.0 |
| Isopropanol | 625.0 |
| Methyl methacrylate | 421.9 |
| Ethoxytriethyleneglycol methacrylate | 130.0 |
| Methacrylic acid | 22.5 |
| Portion 2: | |
| Lupersol ® 11* | 31.25 |
| Isopropanol | 125.0 |
| Portion 3: | |
| Acetone | 125.0 g |
| Isopropanol | 500.0 |
| Methyl methacrylate | 515.6 |
| Ethoxytriethyleneglycol methacrylate | 2570.0 |
| Methacrylic acid | 90.0 |
| Portion 4: | |
| t-Butyl peroxypivalate[1] | 75.0 g |
| Isopropanol | 500.0 |
| Portion 5: | |
| t-Butyl peroxypivalate[1] | 31.25 g |
| Isopropanol | 125.0 |
| Portion 6: | |
| N-Methyl pyrrolidone | 937.5 g |

*t-Butyl peroxypivalate, Elf Atochem North America, Inc. Philadelphia, PA

Portion 1 mixture was charged into a 12 liter flask equipped with a thermometer, stirrer, additional funnels, reflux condenser and a means of maintaining a nitrogen blanket over the reaction mixture. The mixture was heated to reflux temperature at about 78° C. and refluxed for about 10 minutes. Portion 2 was then added all at once. Portions 3 and 4 were then simultaneously fed to the reaction mixture over 4 hours. The reaction mixture was held at reflux temperature during the addition of Portions 3 and 4 and for one hour thereafter. Portion 5 was added all at once, and the reaction was refluxed for 2 hours. Portion 6 was added, and the reaction mixture was cooled to room temperature.

The resulting polymer solution has a solid content of 52.0%, a weight averaged molecular weight of 72,200 and a number averaged molecular weight of 30,500 as measured by Gel Permeation Chromatography (GPC) using polymethyl methacrylate as the standard. 1150 gram of the polymer solution was then dispersed in a solution of 11.72 gram of potassium hydroxide in deionized water with vigorous agitation. The resulting translucent hydrosol solution has a solids content of 20%.

Example 2

Preparation of linear hydrosol benzyl methacrylate-co-ethoxytriethyleneglycol methacrylate-co-methacrylic acid-co-surfactant, 54.6/41.5/3.0/0.9% by weight

| Ingredient | Amount (grams) |
|---|---|
| Portion 1: | |
| Isopropanol | 50.0 |
| Benzyl methacrylate | 26.21 |
| Ethoxytriethyleneglycol methacrylate | 19.92 |
| Methacrylic acid | 1.44 |
| TREM LF-40* | 0.48 |
| SAM ® 187** | 0.24 |
| Portion 2: | |
| Lupersol ® 11 | 2.0 |
| Isopropanol | 12.2 |
| Portion 3: | |
| Isopropanol | 50.0 |
| Benzyl methacrylate | 104.83 |
| Ethoxytriethyleneglycol methacrylate | 79.68 |
| Methacrylic acid | 5.76 |
| TREM ® LF-40 | 1.92 |
| SAM ® 187 | 0.96 |
| Portion 4: | |
| Lupersol ® 11 | 4.40 |
| Isopropanol | 40.0 |
| Portion 5: | |
| N-Methyl pyrrolidone | 60.0 |

*Henkel Chemical Corp., Ambler, PA
**PPG Mazer, PPG Industries, Inc., Monroeville, PA Portion 1 mixture was charged into a 2 liter flask equipped with a thermometer, stirrer, additional funnels, reflux condenser and a means of maintaining a nitrogen blanket over the reaction mixture. The mixture was heated to reflux temperature at about 84° C. and refluxed for about 10 minutes. Portion 2 was added all at once. Portions 3 and 4 were then simultaneously fed to the reaction mixture while the reaction mixture was held at reflux temperature. The addition of Portion 3 was completed in 4 hours while the Portion 4 was completed in 4.5 hours. The reaction mixture was held at reflux temperature for 2 hours. Portion 5 was added all at once, and the reaction mixture was cooled to room temperature.

The resulting polymer solution has a solids content of 52.2%, a weight averaged molecular weight of 49,900 and a number averaged molecular weight of 21,200 as measured by Gel Permeation Chromatography (GPC) using polymethyl methacrylate as the standard. The above polymer was inverted with the addition of a solution of 4.69 gram of potassium hydroxide in 736.31 gram of deionized water and vigorous agitation. The resulting translucent hydrosol solution has a solids content of 19.4%, and an averaged particle size of 26 nm as measured by Brookhaven BI-90 particle sizer.

Example 3

Preparation of linear hydrosol styrene-co-benzyl methacrylate-co-ethoxytriethyleneglycol methacrylate-co-methacrylic acid-co-surfactant, 12.0/42.6/41.5/3.0/0.9% by weight

| Ingredient | Amount (grams) |
|---|---|
| Portion 1: | |
| Acetone | 10.0 |
| Isopropanol | 40.0 |
| Styrene | 5.76 |
| Benzyl methacrylate | 20.45 |
| Ethoxytriethyleneglycol methacrylate | 19.92 |
| Methacrylic acid | 1.44 |
| TREM ® LF-40 | 0.48 |
| SAM ® 187 | 0.24 |
| Portion 2: | |
| Lupersol ® 11 | 2.0 |
| Isopropanol | 12.2 |
| Portion 3: | |
| Acetone | 10.0 |
| Isopropanol | 40.0 |
| Styrene | 23.04 |
| Benzyl methacrylate | 81.79 |
| Ethoxytriethyleneglycol methacrylate | 79.68 |
| Methacrylic acid | 5.76 |
| TREM ® LF-40 | 1.92 |
| SAM ®187 | 0.96 |
| Portion 4 | |
| Lupersol ® 11 | 4.40 |
| Isopropanol | 40.0 |
| Portion 5: | |
| N-Methyl pyrrolidone | 60.0 |

The Portion 1 mixture was charged into a 2 liter flask equipped with a thermometer, stirrer, additional funnels, reflux condenser and a means of maintaining a nitrogen blanket over the reaction mixture. The mixture was heated to reflux temperature at about 82° C. and refluxed for about 10 minutes. To the mixture, Portion 2 was added as one shot. Portions 3 and 4 were then simultaneously fed to the reaction mixture while the reaction mixture was held at reflux temperature. The addition of Portion 3 was completed in 4 hours while Portion 4 was completed in 4.5 hours. The reaction mixture was held at reflux temperature for 2 hours. Portion 5 was added in one shot, and the reaction mixture was cooled to room temperature.

The resulting polymer solution has a solid content of 52.2%, a weight averaged molecular weight of 105,000 and a number averaged molecular weight of 29,500 as measured by Gel Permeation Chromatography (GPC) using polymethyl methacrylate as the standard. The above polymer was inverted by adding a solution of 4.69 gram of potassium hydroxide in 735.31 gram of deionized water with vigorous agitation. The resulting translucent hydrosol solution has a solids content of 19.1%, and an averaged particle size of 30 nm as measured by Brookhaven BI-90 particle sizer.

Example 4

Preparation of linear hydrosol methyl methacrylate-co-ethoxytriethyleneglycol methacrylate-co-methacrylic acid-co-surfactant, 55.1/42.0/2.0.0/0.9% by weight.

| Ingredient | Amount (grams) |
|---|---|
| Portion 1: | |
| N-Methyl pyrrolidone | 10.0 |
| Isopropanol | 40.0 |
| Methyl methacrylate | 36.0 |
| Ethoxytriethyleneglycol methacrylate | 10.61 |
| Methacrylic acid | 0.96 |
| TREM ® LF-40 | 0.48 |
| SAM ® 187 | 0.24 |
| Portion 2: | |
| Lupersol ® 11 | 2.0 |
| Isopropanol | 12.2 |
| Portion 3: | |
| N-Methyl pyrrolidone | 10.0 |
| Isopropanol | 40.0 |
| Methyl methacrylate | 96.24 |
| Ethoxytriethyleneglycol methacrylate | 90.19 |
| Methacrylic acid | 3.84 |
| TREM ® LF-40 | 1.92 |
| SAM ® 187 | 0.96 |
| Portion 4: | |
| Lupersol ® 11 | 4.40 |
| Isopropanol | 40.0 |
| Portion 5: | |
| N-Methyl pyrrolidone | 40.0 |

The Portion 1 mixture was charged into a 2 liter flask equipped with a thermometer, stirrer, additional funnels, reflux condenser and a means of maintaining a nitrogen blanket over the reaction mixture. The mixture was heated to reflux temperature at about 82° C. and refluxed for about 10 minutes. To the mixture, Portion 2 was added as one shot. Portions 3 and 4 were then simultaneously fed to the reaction mixture while the reaction mixture was held at reflux temperature. The addition of Portion 3 was completed in 4 hours while the Portion 4 was completed in 4.5 hours. The reaction mixture was held at reflux temperature for 2 hours. Portion 5 was added in one shot, and the reaction mixture was cooled to room temperature.

The resulting polymer solution has a solids content of 54.5%, a weight averaged molecular weight of 74,600 and a number averaged molecular weight of 29,100 as measured by Gel Permeation Chromatography (GPC) using polymethyl methacrylate as the standard. The above polymer was inverted by adding a solution of 3.14 gram of potassium hydroxide in 756.86 gram of deionized water with vigorous agitation. The resulting translucent hydrosol solution has a solids content of 19.8%, and an averaged particle size of 35 nm as measured by Brookhaven BI-90 particle sizer.

Example 5

Preparation of linear hydrosol methyl methacrylate-co-ethoxytriethyleneglycol methacrylate-co-methacrylic acid-co-surfactant, 72.3/23.8/3.0/0.9% by weight.

| Ingredient | Amount (grams) |
|---|---|
| Portion 1: | |
| Isopropanol | 10.0 |
| N-Methyl pyrrolidone | 40.0 |
| Methyl methacrylate | 34.7 |
| Ethoxytriethyleneglycol methacrylate | 11.42 |
| Methacrylic acid | 1.44 |

-continued

| Ingredient | Amount (grams) |
|---|---|
| TREM ® LF-40 | 0.48 |
| SAM ® 187 | 0.24 |
| *Portion 2:* | |
| Lupersol ® 11 | 2.0 |
| Isopropanol | 12.2 |
| *Portion 3:* | |
| Isopropanol | 10.0 |
| N-Methyl pyrrolidone | 40.0 |
| Methyl methacrylate | 138.82 |
| Ethoxytriethyleneglycol methacrylate | 45.7 |
| Methacrylic acid | 5.76 |
| TREM ® LF-40 | 1.92 |
| SAM ® 187 | 0.96 |
| *Portion 4:* | |
| Lupersol ® 11 | 4.40 |
| Isopropanol | 40.0 |

The Portion 1 mixture was charged into a 2 liter flask equipped with a thermometer, stirrer, additional funnels, reflux condenser and a means of maintaining a nitrogen blanket over the reaction mixture. The mixture was heated to reflux temperature at about 111° C. and refluxed for about 10 minutes. To the mixture, the Portion 2 was added as one shot. Portions 3 and 4 were then simultaneously fed to the reaction mixture while the reaction mixture was held at reflux temperature. The addition of Portion 3 was completed in 4 hours while Portion 4 was completed in 4.5 hours. The reaction mixture was held at reflux temperature for 2 hours. Portion 5 was added in one shot, and the reaction mixture was cooled to room temperature.

The resulting polymer solution has a solids content of 60.0%, a weight averaged molecular weight of 63,900 and a number averaged molecular weight of 22,300 as measured by Gel Permeation Chromatography (GPC) using polymethyl methacrylate as the standard. The above polymer was inverted by adding a solution of 4.69 grams of potassium hydroxide in 795.31 grams of deionized water with vigorous agitation. The resulting milky hydrosol solution has a solids content of 20.2%.

Example 6

Preparation of linear hydrosol butyl acrylate-co-benzyl methacrylate-co-ethoxytriethyleneglycol methacrylate-co-methacrylic acid, 12.0/12.0/71.0/5.0% by weight

| Ingredient | Amount (grams) |
|---|---|
| *Portion 1* | |
| Acetone | 10.0 |
| Isopropanol | 30.0 |
| Butyl acrylate | 13.5 |
| Benzyl methacrylate | 13.5 |
| Ethoxytriethyleneglycol methacrylate | 7.2 |
| Methacrylic acid | 1.8 |
| *Portion 2* | |
| Lupersol ® 11 | 2.0 |
| Isopropanl | 12.2 |
| *Portion 3* | |
| Acetone | 10.0 |
| Isopropanol | 30.0 |
| Butyl acrylate | 15.3 |
| Benzyl methacrylate | 15.3 |

-continued

| Ingredient | Amount (grams) |
|---|---|
| Ethoxytriethyleneglycol methacrylate | 163.2 |
| Methacrylic acid | 10.2 |
| *Portion 4* | |
| Lupersol ® 11 | 4.40 |
| Isopropanol | 41.4 |
| *Portion 5* | |
| N-Methyl pyrrolidone | 60.0 |

The Portion 1 mixture was charged into a 2 liter flask equipped with a thermometer, stirrer, additional funnels, reflux condenser and a means of maintaining a nitrogen blanket over the reaction mixture. The mixture was heated to reflux temperature at about 81° C. and refluxed for about 10 minutes. To the mixture, Portion 2 was added as one shot. Portions 3 and 4 were then simultaneously fed to the reaction mixture while the reaction mixture was held at reflux temperature. The addition of Portion 3 was completed in 4 hours while the addition of Portion 4 was completed in 4.5 hours. The reaction mixture was held at reflux temperature for 2 hours. Portion 5 was added in one shot, and the reaction mixture was cooled to room temperature.

The resulting polymer solution has a solid content of 54.5%, a weight averaged molecular weight of 118,000 and a number averaged molecular weight of 32,900 as measured by Gel Permeation Chromatography (GPC) using polymethyl methacrylate as the standard. The above polymer was inverted by adding a solution of 7.83 grams of potassium hydroxide in 752.17 grams of deionized water with vigorous agitation. The resulting almost clear hydrosol solution has a solid content of 19.8%.

Example 7

Preparation of linear hydrosol benzyl methacrylate-co-ethoxytriethyleneglycol methacrylate-co-methacrylamidoethylethylene urea-co-methacrylic acid, 20.0/73.0/5.0/2.0% by weight

| Ingredient | Amount (grams) |
|---|---|
| *Portion 1:* | |
| N-Methyl pyrrolidone | 20.0 |
| Isopropanol | 60.0 |
| *Portion 2:* | |
| N-Methyl pyrrolidone | 20.0 |
| Isopropanol | 20.0 |
| Benzyl methacrylate | 48.0 |
| Ethoxytriethyleneglycol methacrylate | 175.2 |
| Sipomer ® WAM II* | 24.0 |
| *Portion 3:* | |
| Lupersol ® 11 | 6.4 |
| Isopropanol | 30.0 |
| *Portion 4* | |
| Lupersol ® 11 | 2.0 |
| Isopropanol | 10.0 |

*a mixture of methacrylamidoethylethylene urea, 50%, and methacrylic acid, 20%, in water (Rhone-Poulenc Surfactants & Specialties, Dayton, NJ)

The Portion 1 mixture was charged into a 2 liter flask equipped with a thermometer, stirrer, additional funnels, reflux condenser and a means of maintaining a nitrogen blanket over the reaction mixture. The mixture was heated to reflux temperature at about 90° C. and refluxed for about 10 minutes. To the mixture, Portions 2 and 3 were simultaneously fed to the reaction mixture over a period of 4 hours while the reaction mixture was held at reflux temperature. The reaction mixture was held at reflux temperature for 1 hour. Portion 4 was added in one shot, and the reaction mixture was refluxed for another hour and cooled to room temperature.

The resulting polymer solution has a solid content of 55.0%, a weight averaged molecular weight of 46,900 and a number averaged molecular weight of 17,800 as measured by Gel Permeation Chromatography (GPC) using polymethyl methacrylate as the standard. The above polymer was inverted by adding a solution of 3.14 grams of potassium hydroxide in 760.26 grams of deionized water with vigorous agitation. The resulting light brown, almost clear hydrosol solution has a solid content of 19.6%.

Example 8

Preparation of linear hydrosol butyl methacrylate-co-ethoxytriethyleneglycol methacrylate-co-methacrylic acid, 20.0/78.0/2.0% by weight

| Ingredient | Amount (grams) |
|---|---|
| Portion 1: | |
| N-Methyl pyrrolidone | 20.0 |
| Isopropanol | 60.0 |
| Portion 2: | |
| N-Methyl pyrrolidone | 20.0 |
| Butyl methacrylate | 48.0 |
| Ethoxytriethyleneglycol methacrylate | 187.2 |
| Methacrylic acid | 4.8 |
| Portion 3: | |
| Lupersol ® 11 | 6.4 |
| Isopropanol | 30.0 |
| Portion 4: | |
| Lupersol ® 11 | 2.0 |
| Isopropanol | 10.0 |
| Portion 5 | |
| N-Methyl pyrrolidone | 20.0 |

The Portion 1 mixture was charged into a 2 liter flask equipped with a thermometer, stirrer, additional funnels, reflux condenser and a means of maintaining a nitrogen blanket over the reaction mixture. The mixture was heated to reflux temperature at about 90° C. and refluxed for about 10 minutes. To the mixture, Portions 2 and 3 were simultaneously fed to the reaction mixture over a period of 4 hours while the reaction mixture was held at reflux temperature. The reaction mixture was held at reflux temperature for 2 hours. Portion 4 was added in one shot, and the reaction mixture was refluxed for another hour. Portion 5 was added in one shot and the reaction mixture was cooled to room temperature.

The resulting polymer solution has a solid content of 58.8%, a weight averaged molecular weight of 53,000 and a number averaged molecular weight of 19,700 as measured by Gel Permeation Chromatography (GPC) using polymethyl methacrylate as the standard. The above polymer was inverted by adding a solution of 3.14 grams of potassium hydroxide in 788.46 grams of deionized water with vigorous agitation. The resulting almost clear hydrosol solution has a solid content of 18.1%.

Example 9

Preparation of a hydrosol with a graft structure

Step A: Preparation of macromonomer 2-ethylhexyl methacrylate-co-iso-butyl methacrylate-co-hydroxyethyl methacrylate, 75/5/20% by weight

| Ingredient | Amount (grams) |
|---|---|
| Portion 1: | |
| Propylene glycol monomethyl ether | 200.0 |
| Ethyl acetate | 61.3 |
| iso-Butyl methacrylate | 15.25 |
| 2-Ethylhexyl methacrylate | 228.94 |
| 2-Hydroxyethyl methacrylate | 61.07 |
| Portion 2: | |
| Diaquabis(borondifluorodiphenyl glyoximato) cobaltate (II), Co(DPG-BF$_2$) in ethyl acetate (0.13%) | 34.15 |
| Vazo ® 88* | 0.5 |
| Ethyl acetate | 6.0 |
| Butyl acetate | 7.8 |
| Portion 3: | |
| iso-Butyl methacrylate | 22.87 |
| 2-Ethylhexyl methacrylate | 343.42 |
| 2-Hydroxyethyl methacrylate | 91.61 |
| Butylacetate | 2.95 |
| Portion 4: | |
| Vazo ® 88 | 2.0 |
| Propylene glycol monomethyl ether | 70.6 |
| Butyl acetate | 12.95 |
| Portion 5: | |
| Vazo ® 88 | 0.4 |
| Propylene glycol monomethyl ether | 18.0 |
| Butyl acetate | 4.95 |
| Portion 6: | |
| +-Butyl peroctoate | 0.3 |
| Butyl acetate | 28.0 |

*1,1'-azobis(cyanocyclohexane), Du Pont Co., Wilmington, DE

The Portion 1 mixture was charged into a 2 liter flask equipped with a thermocouple, stirrer, additional funnels, reflux condenser and a means of maintaining a nitrogen blanket over the reactants. The mixture was heated to reflux temperature (128–135° C.) and refluxed for about 10 minutes. To the mixture, Portion 2 was added over 5 minutes. Portions 3 and 4 were then simultaneously added while the reaction mixture was held at reflux temperature (116–122° C.) over 4 hours. Following a 30 minutes hold period, Portion 5 was added over 60 minutes. Reflux was continued for another 60 minutes. Portion 6 was added as a shot and the reaction mixture was cooled to room temperature.

The resulting macromonomer solution had a solid content of about 63.70%, a weight average molecular weight of 8,469 and a number average molecular weight of 5,696 as measured by Gel Permeation Chromatography (GPC) using polymethyl methacrylate as the standard.

Step B

This shows the preparation of a graft hydrosol polymer, styrene-co-methyl methacrylate-co-butyl acrylate-co-hydroxyethyl acrylate-co-methacrylic acid-g-ethylhexyl methacrylate-co-iso-butyl methacrylate-co-hydroxyethyl methacrylate 10/20/7.5/10/2.5//37.5/2.5/10% by weight, from a macromonomer.

| Ingredient | Amount (grams) |
|---|---|
| Portion 1: | |
| Macromonomer of Step A | 156.25 |
| Propylene glycol monomethyl ether | 33.00 |
| Portion 2: | |
| Methyl methacrylate | 40.00 |
| Styrene | 20.00 |
| Butyl acrylate | 15.00 |
| Hydroxyethyl acrylate | 20.00 |
| Methacrylic acid | 5.00 |
| Propyleneglycol monomethyl ether | 10.00 |
| Portion 3: | |
| +-Butyl peracetate | 1.80 |
| Propylene glycol monomethyl ether | 19.00 |

The Portion 1 mixture was charged into a 500 mL flask equipped with a thermocouple, stirrer, additional funnels, reflux condenser and a means of maintaining a nitrogen blanket over the reaction mixture. The mixture was heated to reflux temperature and refluxed for about 10 minutes. Portions 2 and 3 were simultaneously fed to the reaction mixture over 3 hours while the reaction mixture was held at reflux temperature at about 110–115° C. The reaction mixture was refluxed for additional 3 hours.

This graft copolymer contains a random copolymer of styrene, methyl methacrylate, butyl acrylate, hydroxyethyl acrylate, and methacrylic acid as the backbone and random copolymers of 2-ethylhexyl methacrylate, iso-butyl methacrylate, and hydroxyethyl methacrylate as the arms. The graft copolymer had a weight averaged molecular weight of 18,590 and a number averaged molecular weight of 10,160 as measured by Gel Permeation Chromatography (GPC) using polystyrene as the standard.

Step C

The above polymer solution, 20 grams, was dried by evaporating off solvents to give 12.5 grams of white solid polymer. It was then inverted by dispersing the solids in a solution of 0.2 gram of potassium hydroxide in 49.75 grams of deionized water with vigorous agitation. The resulting translucent hydrosol solution has a solid content of 20.0%.

Example 10

Preparation of a block copolymer dispersant, poly (methacrylic acid-b-benzyl methacrylate-b-ethoxytriethylene glycol methacrylate), MAA//BzMA//ETEGMA (12//15//4)

To a solution of 146.5 g (0.63 mol) of 1,1-bis (trimethylsiloxy)-2-methyl-1-propene and 3.5 g of tetrabutyl ammonium m-chlorobenzoate (1.0 M solution in acetonitrile) in 3000 g THF, was slowly added 1197.3 g (7.58 mol) of trimethylsilyl methacrylate in 25 minutes under nitrogen atmosphere. The temperature rose from 22.3° C. to 51.1° C. during the course of the addition. When the temperature fell to 41.0° C., 70 minutes later, 0.5 mL of tetrabutyl ammonium m-chlorobenzoate was added and no exotherm was detected. To the reaction mixture was then slowly added 1666.1 g (9.46 mol) of benzyl methacrylate (dried over molecular sieves) in 45 minutes. The temperature rose to 61.8° C. during the course of the addition. When the temperature fell to 28.3° C., about 100 minutes later, 0.5 mL of tetrabutyl ammonium m-chlorobenzoate was added and no exotherm was detected. To the reaction mixture was then added 628.6 g (2.56 mol) of ethoxytriethyleneglycol methacrylate (dried over molecular sieves) over 20 minutes. The temperature rose to 31.8° C. The reaction mixture was stirred for 2.5 hours. It was quenched with 525 g of methanol and stirred overnight. The mixture was distilled until 2600 g of volatiles were collected, and 1700 g of 2-pyrrolidone was added. Further distillation removed 924.2 g of volatiles and another 2351.9 g of 2-pyrrolidone were added to yield a 39% polymer solution.

The block polymer was neutralized using the following procedure: 131 g of the polymer were mixed with 17.6 g of potassium hydroxide solution (46.4% in deionized water) and 482.8 g of deionized water until a homogeneous 10% polymer solution was obtained.

Example 11

A black pigment dispersion was prepared using the following procedure:

| | |
|---|---|
| FW18, Carbon black pigment (Degussa Corp.) | 200 (parts) |
| Polymer obtained from above, (10% solution) | 1,000 |
| Deionized water | 800 |

The above mentioned components were premixed in a plastic beaker by mechanical stirring until no lumps or dry clumps were visible. The mixture was dispersed in a microfluidizer (Microfluidics Corp., Watham, Mass.) by passing it through the interaction chamber 5 times under a liquid pressure of about 8,000 psi (55.16 N/mm$^2$). The resulting pigment dispersion had a 10% pigment concentration with an average particle size of 111 nm as determined by Brookhaven BI-90 particle sizer. The dispersion was filtered through a 1 micron high efficiency filter bag (3M Filtration Products, St. Paul, Minn.). The final pH was 7.8.

Example 12

Preparation of graft copolymer dispersant 2-phenoxyethyl acrylate-co-methyl methacrylate-g-ethoxytriethyleneglycol methacrylate-co-methacrylic acid, 56.9/19.8//2.9/20.4 by weight Step A Preparation of macromonomer ethoxytriethyleneglycol methacrylate-co-methacrylic acid, 12.5/87.5 by weight

| Ingredient | Amount (grams) |
|---|---|
| Portion 1: | |
| isopropanol | 453.5 |
| acetone | 152.0 |
| Portion 2: | |
| methacrylic acid monomer | 360.5 |
| ethoxytriethyleneglycol methacrylate monomer | 52.2 |
| Portion 3 | |
| Diaquabis(borondifluorodiphenyl glyoximato) cobaltate (II), Co(DPG-BF$_2$) | 0.31 |
| Vazo ® 52* | 11.86 |
| acetone | 150.0 |

*2,2'-azobis(2,2-dimethylvaleronitrile), Du Pont Co., Wilmington, DE

The Portion 1 mixture was charged into a 3 liter flask equipped with a thermometer, stirrer, additional funnels, reflux condenser and a means of maintaining a nitrogen blanket over the reactants. The mixture was heated to reflux temperature and refluxed for about 20 minutes. Portions 2 and 3 were simultaneously added while the reaction mixture was held at reflux temperature at about 70–71° C. The addition of Portion 2 was completed in 4 hours and the addition of Portion 3 was completed in 4 ½ hours. Reflux was continued for another 2 ½ hours and the solution was cooled to room temperature.

The resulting macromonomer solution was a clear thin polymer solution and had a solid content of about 32.2%. The macromonomer contained 12.5% of ethoxytriethyl-eneglycol methacrylate and 87.5% of methacrylic acid and had a weight average molecular weight of 3,350 and a number average molecular weight of 2,570 as measured by Gel Permeation Chromatography (GPC) on a methylated macromonomer sample using polymethyl methacrylate as the standard.

Step B: Preparation of a graft copolymer

| Ingredient | Amount (grams) |
|---|---|
| Portion 1: | |
| Macromonomer of Step A | 85.7 |
| 2-Pyrrolidone | 30.0 |
| Portion 2: | |
| Lupersol ® 11 | 0.75 |
| Acetone | 5.0 |
| Portion 3: | |
| 2-Phenoxyethyl acrylate | 73.2 |
| Methyl methacrylate | 25.5 |
| Portion 4: | |
| Lupersol ® 11 | 3.0 |
| Acetone | 20.0 |
| Portion 5: | |
| Lupersol ® 11 | 0.75 |
| Acetone | 5.0 |

The Portion 1 mixture was charged into a 500 mL flask equipped with a thermometer, stirrer, additional fennels, reflux condenser and a means of maintaining a nitrogen blanket over the reaction mixture. The mixture was heated to reflux temperature and refluxed for about 10 minutes. Portion 2 solution was added. Subsequently, Portions 3 and 4 were simultaneously added while the reaction mixture was held at reflux temperature. The addition of Portions 3 and 4 was completed in 3 hours. The reaction mixture was refluxed for 1 hour. Portion 5 solution was added. The reaction mixture was refluxed at about 66° C. for additional 2 hours. The mixture was distilled until about 74.5 g of volatiles were collected and 111.6 g of 2-pyrrolidone were added to yield 286.0 g of a 43.7% polymer solution.

This graft copolymer contained a random copolymer of 56.9% by weight of 2-phenoxyethyl acrylate and 19.8% by weight of methyl methacrylate in the backbone and a random copolymer of 2.9% by weight of ethoxytriethyl-eneglycol methacrylate and 20.4% by weight of methacrylic acid in the arms. The graft copolymer had a weight averaged molecular weight of 34,700 and a number averaged molecular weight of 14,900 as measured by Gel Permeation Chromatography (GPC) using a methylated polymer sample and polystyrene as the standard.

The graft copolymer was neutralized using the following procedure: 429.1 g of the polymer were mixed with 55.0 g of potassium hydroxide solution (45.5% in deionized water) and 1390.9 g of deionized water until a homogeneous 10% polymer solution was obtained.

Example 13

A black pigment dispersion was prepared using the following procedure:

| | |
|---|---|
| FW18, Carbon black pigment | 450 (parts) |
| Polymer obtained from above, (10% solution) | 1,875 |
| Deionized water | 675 |

The above mentioned components were premixed in a plastic beaker by mechanical stirring until no lumps or dry clumps were visible. The mixture was dispersed in a microfluidizer (Microfluidics Corp., Watham, Mass.) by passing it through the interaction chamber 5 times under a liquid pressure of about 8,000 psi (55.16 N/mm$^2$). The resulting pigment dispersion had a 15% pigment concentration with an average particle size of 107 nm as determined by Brookhaven BI-90 particle sizer. The dispersion was filtered through a 1 micron high efficiency filter bag (3M Filtration Products, St. Paul, Minn.). The final pH was 8.49.

Ink Test

The pigment dispersion concentrate of Example 11 or Example 13 was letdown with a vehicle solution to give the following composition.

| | |
|---|---|
| Carbon Black, FW18 | 2.75 (%) |
| Dispersant | 1.38* |
| Hydrosol solution (19.0–20.0%) | 2.0 |
| 2-Pyrrolidone | 5.0 |
| N-Methylpyrrolidone | 2.0 |
| Liponic ® EG-1 | 4.25 |
| (Lipo Chemicals Inc., Paterson, NJ.) | |
| Zonyl ® FSA | 0.05 |
| (DuPont Co., Wilmington, DE) | |
| Proxel ® G | 0.15 |
| (Zeneca Inc., Wilmington, DE) | |
| Deionized water | 82.6 |

*The dispersant concentration was 1.15% when the graft copolymer of Example 12 was used.

The ink was filled into a thermal ink jet pen and printed with a Hewlett Packard DeskJet ink jet printer (Hewlett Packard Co., Palo Alto, Calif.) on Gilbert bond paper (25% cotton, Mead Co., Dayton, Ohio). The printing results are listed in Table 1. All experimental inks dried rapidly and the prints became completely waterfast immediately after drying.

Table 1

The ink stability was determined by measuring the particle size change by Brookhaven BI-90 particle sizer (Brookhaven Instrument Corp., Holtsville, N.Y. 11742) after the ink sample had been subjected to 4 temperature cycles, each consisting of 4 hours at −20° C. and 4 hours at 70° C. All of the experimental inks showed no significant change. Print quality refers to the edge acuity. Printing performance refers to pen reliability including the smoothness of ink drop ejection and the likelihood of crust formation on the orifice plate. Smear/smudge properties was determined by the following method. A series of ⅛" of parallel solid bars were printed with ⅜" of white spacing between the bars. The prints were allowed to dry for 1 hour. A pair of highlighters from Sanford Corp., Bellwood, Ill., the regular Major Accent® yellow highlighting marker and the Major Accent® light green fluorescent highlighting marker, were used to draw across the solid bars with a constant pressure at a constant speed. The amount of ink transferred from the printed solid bar to the white spacing was then used to judge the resistance to smear. The rating of "Excellent" indicates very little or no ink transfer was detected. The rating of "Very poor" indicates more than 40% of ink density has been transferred to the white spacings.

| Ink # | Hydrosol | Print Performance | Print Quality | Optical Density | Smear/Smudge |
|---|---|---|---|---|---|
| 1 (Control) | None | Excellent | Excellent | 1.45 | Very Poor |
| 2 | Exp. 1 | Excellent | Excellent | 1.36 | Excellent |
| 3 | Exp. 2 | Good | Excellent | 1.14 | Excellent |
| 4 | Exp. 3 | Good | Excellent | 1.10 | Excellent |
| 5 | Exp. 4 | Good | Excellent | 1.14 | Excellent |
| 6 | Exp. 5 | Good | Excellent | 1.18 | Excellent |
| 7 | Exp. 6 | Excellent | Excellent | 1.33 | Excellent |
| 8 | Exp. 7 | Excellent | Excellent | 1.33 | Excellent |
| 9 | Exp. 8 | Excellent | Excellent | 1.35 | Excellent |
| 10 | Exp. 9 | Good | Excellent | 1.20 | Excellent |
| 11* | Exp. 8 | Excellent | Excellent | 1.44 | Excellent |

*Dispersion of Example 11 was used in the ink test, except for ink #11, which contained the dispersion from Example 13.

What is claimed is:

1. An ink jet ink composition comprising:
   (a) an aqueous carrier medium;
   (b) an aqueous carrier medium insoluble colorant;
   (c) polymeric dispersant; and
   (d) a hydrosol polymer;
wherein the ink jet ink composition has a surface tension between 20 dyne/cm and 70 dyne/cm and a viscosity of less than 20 cP and wherein the aqueous carrier medium comprises 70 to 99.8% by weight of the total ink composition.

2. The ink jet ink composition of claim 1 wherein the hydrosol polymer is an acrylic hydrosol.

3. The ink jet ink composition of claim 2 wherein the hydrosol polymer is selected from the group consisting of linear and graft polymers.

4. The ink jet ink composition of claim 2 wherein the hydrosol polymer is prepared from at least one monomer containing at least one non-ionic hydrophilic ethylene oxide group.

5. The ink jet ink composition of claim 4 wherein the monomer containing at least one non-ionic hydrophilic ethylene oxide group is selected from the group consisting essentially of 2-(2-methoxyethoxy)ethyl acrylate, 2-(2-methoxyethoxy)ethyl methacrylate, ethoxytriethyleneglycol methacrylate, methoxy polyethyleneglycol monomethacrylate and polyethyleneglycol monomethacrylate.

6. The ink jet ink composition of claim 2 wherein the hydrosol polymer is prepared from at least one monomer containing ionizable groups.

7. The ink jet ink composition of claim 6 wherein the hydrosol polymer is anionic and the monomer containing ionizable groups is selected from the group consisting essentially of acrylic acid, methacrylic acid, crotonic acid, itaconic acid, itaconic acid monoester, maleic acid, maleic acid monoester, maleic anhydride, fumaric acid, fumaric acid monoester, styrene sulfonic acid and 2-acrylamido-2-propane sulfonic acid (AMPS).

8. The ink jet ink composition of claim 6 wherein the hydrosol polymer is cationic and the monomer containing ionizable groups is an amine containing monomer.

9. The ink jet ink composition of claim 8 wherein the amine containing monomer is selected from the group consisting essentially of N,N-dimethylaminoethyl acrylate, N,N-dimethylaminoethyl methacrylate, N,N-diethylaminoethyl methacrylate, t-butylaminoethyl methacrylate, 2-N-morpholinoethyl acrylate, 2-N-morpholinoethyl metharylate, 4-aminostyrene, 2-vinylpyridine and 4-vinylpyridine.

10. The ink jet ink composition of claim 2 wherein the hydrosol polymer comprises up to 5% by weight of a surface active monomer based on the weight of the hydrosol polymer.

11. The ink jet ink composition of claim 2 wherein the hydrosol polymer comprises hydrophobic non-functional monomers selected from the group consisting of methyl acrylate, ethyl acrylate, propyl acrylate, n-butyl acrylate, hexyl acrylate, 2-ethylhexyl acrylate, phenyl acrylate, benzyl acrylate, 2-phenylethyl acrylate, hydroxyethylacrylate, methyl methacrylate, ethyl methacrylate, propyl methacrylate, n-butyl methacrylate, hexyl methacrylate, 2-ethylhexyl methacrylate, phenyl methacrylate, benzyl methacrylate, 2-phenylethyl methacrylate and hydroxyethyl methacrylate.

12. The ink jet ink composition of claim 1 wherein the hydrosol polymer comprises non-acrylic monomers selected from the group consisting of styrene, a-methyl styrene, vinyl naphthalene, vinylidene chloride, vinyl acetate, vinyl chloride and acrylonitrile, wherein the non-acrylic monomer is present in a minor amount in the hydrosol polymer.

13. The ink jet ink composition of claim 1 wherein the hydrosol polymer is present in the amount of 0.1 to 20% by weight, based on the total weight of the ink composition.

14. The ink jet ink composition of claim 1 wherein the aqueous carrier medium insoluble colorant is a pigment.

15. The ink jet ink composition of claim 1 wherein polymeric dispersant is a structured polymer.

16. The ink composition of claim 1 wherein said polymeric dispersant is a block copolymer, and wherein the ink composition comprises approximately 0.1 to 8% pigment, 0.1 to 8% block copolymer, and 94 to 99.7% aqueous carrier medium and 0.1 to 20% a hydrosol polymer, based upon the total weight of the ink composition.

* * * * *